S. H. KENNEDY.
GEARING.
APPLICATION FILED APR. 5, 1911.
1,041,483.
Patented Oct. 15, 1912.
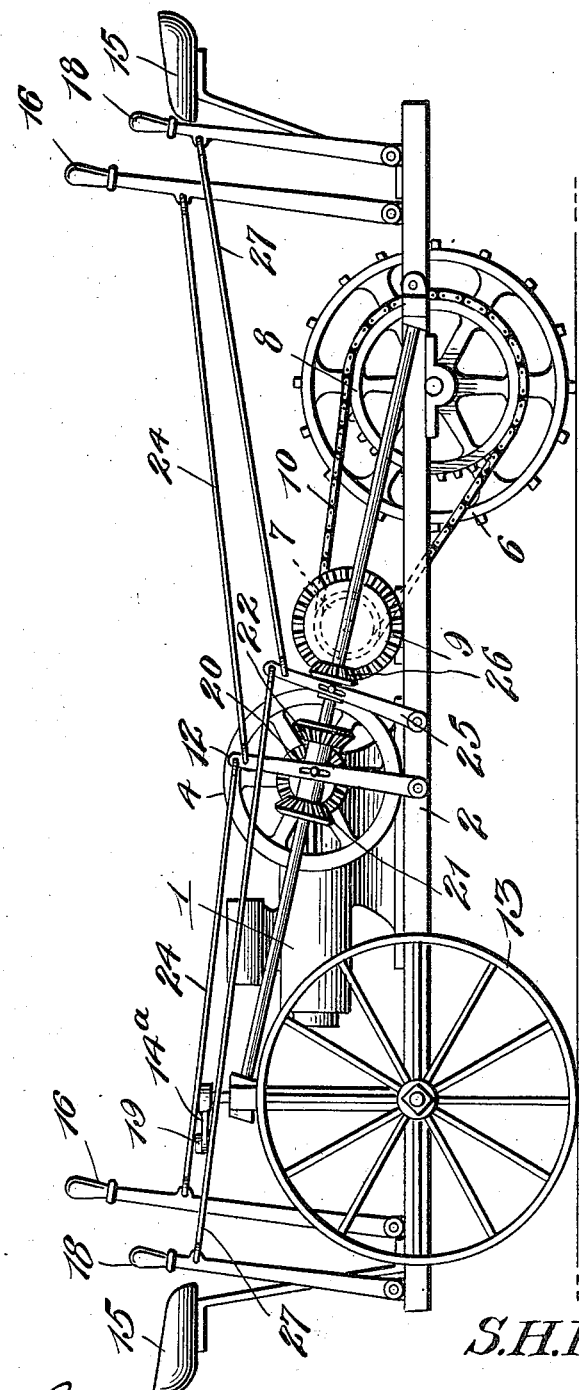

UNITED STATES PATENT OFFICE.

SAMUEL H. KENNEDY, OF TUNNEL HILL, GEORGIA.

GEARING.

1,041,483.  Specification of Letters Patent.  Patented Oct. 15, 1912.

Application filed April 5, 1911. Serial No. 619,176.

*To all whom it may concern:*

Be it known that I, SAMUEL H. KENNEDY, a citizen of the United States, residing at Tunnel Hill, in the county of Whitfield and State of Georgia, have invented certain new and useful Improvements in Gearing, of which the following is a specification, reference being had to the accompanying drawings.

My invention relates to agricultural vehicles, and more particularly to a traction machine for pulling a gang of plows, harrows and the like across fields.

The object of my invention is to provide a machine which will draw general agricultural apparatus across fields to be cultivated.

Another object of my invention is to provide a machine that can be used for cultivating purposes in fields containing large or small growing crops without detriment to them.

Other objects will become apparent as my invention is more fully set forth.

In the accompanying drawings which illustrate one form of my invention the figure is a side elevation of a machine embodying my invention.

In the construction illustrated by way of example in the appended drawings, 1 is a motor which is mounted on a main frame 2 of the machine and rotates a shaft which is provided with the usual flywheel 4. One end of this shaft is provided with a bevel gear 20 which transmits the power from the motor 1 to the longitudinally inclined shaft 5 through the bevel gears 21, or 22, as the case may be. The power is then transmitted from the shaft 5 to a main traction wheel 6 through the gears 7, 8 and 9, and the chain 10. A lever 12 is provided for moving the gears 21 or 22 into or out of engagement with the gear 20 for reversing the direction of movement of the machine. A sleeve surrounds the shaft 5 and connects the gears 21 and 22 as clearly shown in Fig. 1. A collar is loosely engaged with this sleeve and is provided with a stud projecting through the slot in the lever 12, as shown. A lever 25 is similarly connected to the gear 26 and is provided for throwing the gears 9 and 26 into or out of engagement thereby causing the machine to move on or stop. Wheels 13, mounted on a highly arched axle which is supported on the front end of the main frame 2, are arranged to be steered through the operation of the rudder arms 14ª which are connected by a bar 19. At each end of the frame of the machine an operator's seat 15 is arranged adjacent to which the steering levers 17 are mounted, said levers being connected through the medium of a bell crank lever 23 to the transverse bar 19 whereby the arms 14ª are actuated. Levers 16 and 18 are also arranged adjacent to the operator's seat and are connected by means of the rods 24 and 27 respectively to the levers 12 and 25. In this manner the operation of the machine can be controlled from either end thereof.

The operation of the machine is as follows: After the motor is started the operator sits in the seat facing the direction in which he intends the machine to move and operates the lever 16, throwing the gear 21 into engagement with the bevel gear 20, which immediately transmits the power to the shaft 5; then by actuating the lever 18 the power is transmitted through the gear 26 to 9 and the sprockets to the traction wheel 6 and the vehicle is propelled forward. Should it be desirable to reverse the direction of the machine, the operator actuates the lever 16 to pull out the gear 21 and to throw the reversing gear 22 into engagement with the gear 20.

Obviously while I have described my invention with only one-speed gears, I anticipate the use of multispeed gearing and suitable clutches and levers therefor and I do not purpose limiting this application for patent otherwise than necessitated by the prior art as various details of construction may be varied without departing from the principles of my invention.

It will be noted from reference to Fig. 1 that the levers 16 and 12 are inclined and disposed in substantially parallel relation. The combined weight of these levers acts in conjunction with the inclined driven shaft 5 to maintain the connected gears 21 and 22 in their adjusted positions upon said shaft, and the oppositely inclined rods 24 which connect the lever 12 to the levers 16 overcome any tendency of the levers 16 to move from their inclined positions which might be occasioned by the vibration of the vehicle body.

Having thus described my invention I claim:

In a driving mechanism for vehicles, the combination of a driving shaft, a gear secured on one end thereof, a driven shaft arranged at the end of said driving shaft and longitudinally inclined with relation to the transverse axis thereof, spaced gears longitudinally movable upon said driven shaft adapted to engage the gear on the driving shaft at opposite points, a sleeve connecting said gears, a vertically disposed lever fulcrumed at one end and having a slot and pin connection with said sleeve, rods connected to the upper end of said lever and extending in opposite directions therefrom, operating levers fulcrumed at their lower ends, said rods being connected to the operating levers adjacent the upper ends thereof and inclined upwardly from said first named lever to the operating levers whereby upon the manipulation of either of said latter levers the gears on the driven shaft are simultaneously moved to engage one of them with the gear on the driving shaft and disengage the other of said gears therefrom.

In testimony whereof I hereunto affix my signature in the presence of two witnesses.

SAMUEL H. KENNEDY.

Witnesses:
J. P. WARD,
J. M. MOODY.

Copies of this patent may be obtained for five cents each, by addressing the "Commissioner of Patents, Washington, D. C."